R. CONWAY.
Gate.
No. 62,396.
Patented Feb. 26, 1867.
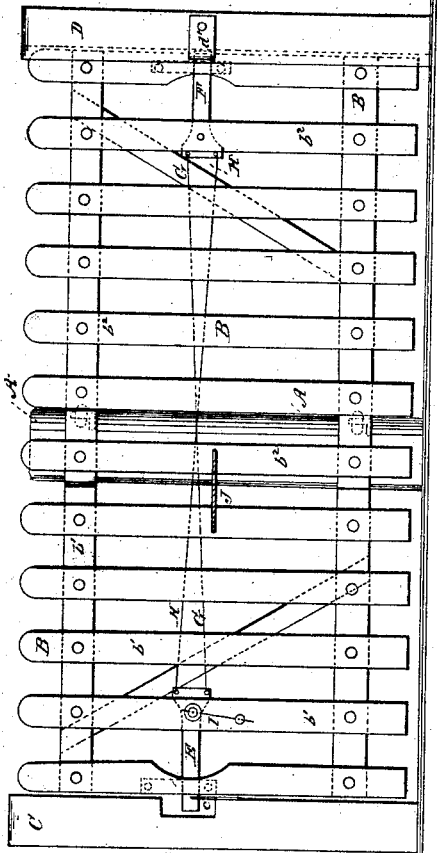
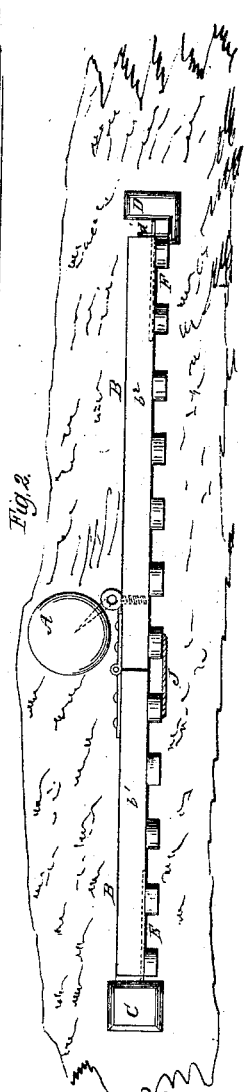

United States Patent Office.

RODOLPHUS CONWAY, OF VOLGA, INDIANA.

Letters Patent No. 62,396, dated February 26, 1867.

---

IMPROVEMENT IN GATES.

---

The Schedule referred to in these Letters Patent and making part of the same.

---

TO ALL WHOM IT MAY CONCERN:

Be it known that I, RODOLPHUS CONWAY, of Volga, in the county of Jefferson, and State of Indiana, have invented a new and useful Improvement in Gate; and I do hereby declare that the following is a full, clear, and exact description thereof, which will enable others skilled in the art to make and use the same, reference being had to the accompanying drawings, forming part of this specification, in which—

Figure 1 is a side view of my improved gate.

Figure 2 is a top view of the same.

Similar letters of reference indicate like parts.

My invention consists in an improved gate formed in two parts, hinged to each other, and hinged at its centre to a central post; in the combination and arrangement of the cross-wires with the latches of the gates, so that one latch cannot be operated without operating the other; and in the combination of a spring with the parts of the gate to hold the said parts spread or extended when the gate is fully opened.

A is the central post to which the gate B is hinged at its central point by ordinary hinges. The gate B is made in two unequal parts, $b^1$ and $b^2$, which are hinged to each other, as shown in fig. 2. C and D are the end posts, to which are attached the catches $c^1$ and $d^1$, upon which the latches E and F catch to hold the gate closed. The post C is so formed that the part $b^1$ of the gate B may be opened in either direction. But the post D is so formed, as shown in figs. 1 and 2, that the part $b^2$ of the gate can be opened only in one direction. The latches E and F are pivoted to the gate A in the ordinary manner, and have their rear ends, which extend beyond the pivoting points, made broad, as shown in the drawings. The rear ends of the latches E and F are connected to each other by wires G and H. One end of the wire G is attached to the upper edge of the rear end of the latch F, and its other end to the lower edge of the rear end of the latch E, and the ends of the wire H are attached to the other edges of the said rear ends of the latches, so that the two wires cross each other at the centre of the gate, as shown in fig. 1. By this construction both latches are operated by operating either of them, so that both parts of the gate may be opened from either end. In case the gate is very long the wires G H should be jointed at the point where the parts $b^1$ and $b^2$ of the gate B are hinged to each other, so that they may not interfere with opening the part $b^1$ of said gate. I is a spring which may be attached to either or both of the latches E F to cause them to take hold of the catches $c^1$ $d^1$ promptly when the gate is shut. J is a spring attached to the parts $b^1$ and $b^2$ of the gate to keep said parts extended or spread when the gate is swung open. This spring, J, may be a rubber spring, as shown in the drawings, or it may be a coiled wire spring, or a spring of any other kind which will produce the desired effect.

What I claim as new, and desire to secure by Letters Patent, is—

1. An improved gate, B, formed in two parts, $b^1$ and $b^2$, hinged to each other, and which is hinged at its centre to a central post A, substantially as herein shown and described.

2. The combination and arrangement of the wires G H, with the latches E F, substantially as herein shown and described and for the purpose set forth.

3. The combination of the spring J with the parts $b^1$ and $b^2$ of the gate B, substantially as herein shown and described and for the purpose set forth.

RODOLPHUS CONWAY.

Witnesses:
JOHN CONWAY,
EDWARD CONWAY.